Sept. 9, 1969     T. G. ZABALBEITIA     3,466,592
BIVOLTAGE CONNECTION APPARATUS FOR ELECTRIC BRAKES
Filed May 10, 1967     2 Sheets-Sheet 1
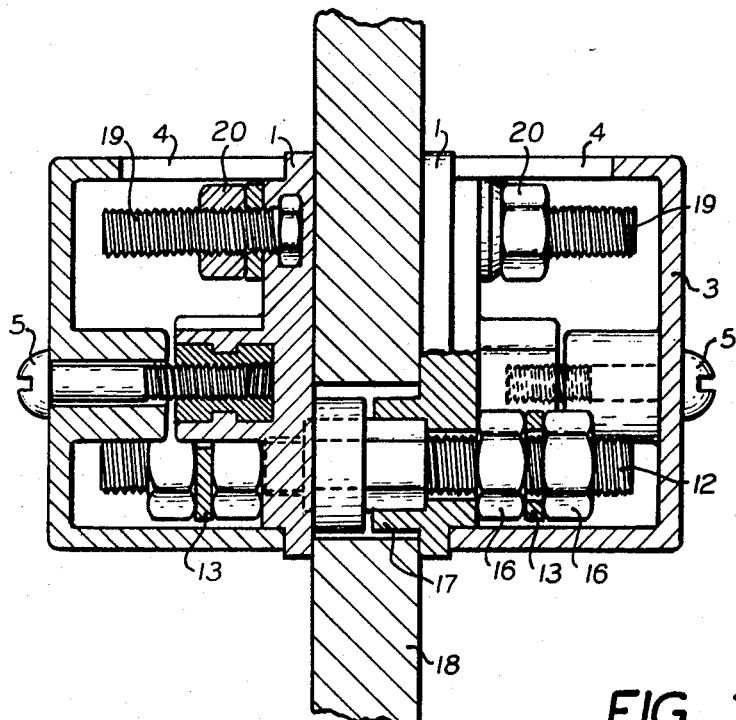
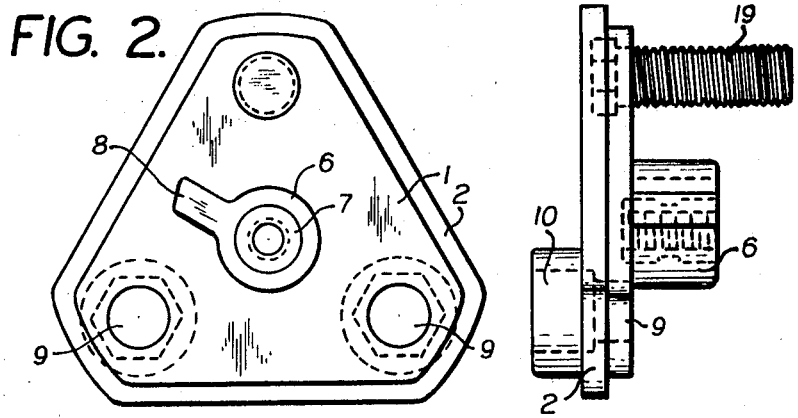
INVENTOR
TELESFORO GOROSTIZA ZABALBEITIA
BY
ATTORNEY.

Sept. 9, 1969  T. G. ZABALBEITIA  3,466,592
BIVOLTAGE CONNECTION APPARATUS FOR ELECTRIC BRAKES
Filed May 10, 1967  2 Sheets-Sheet 2
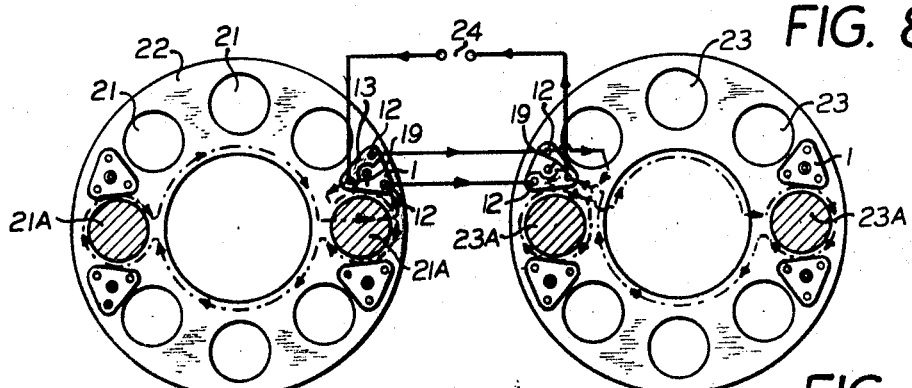
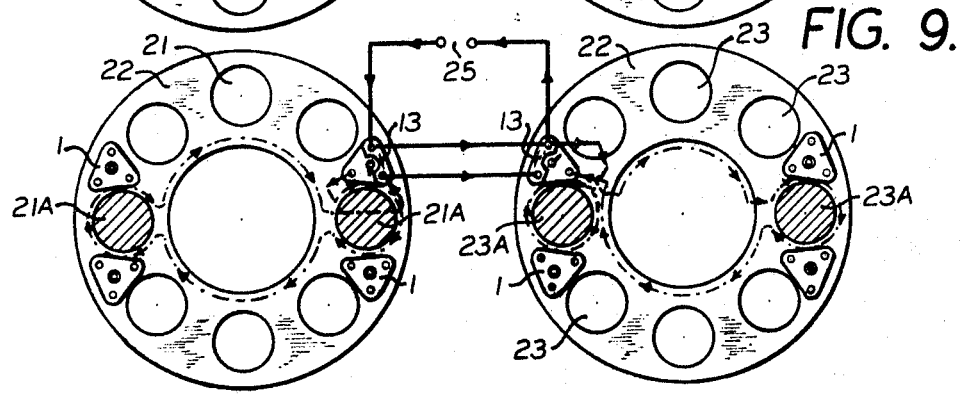
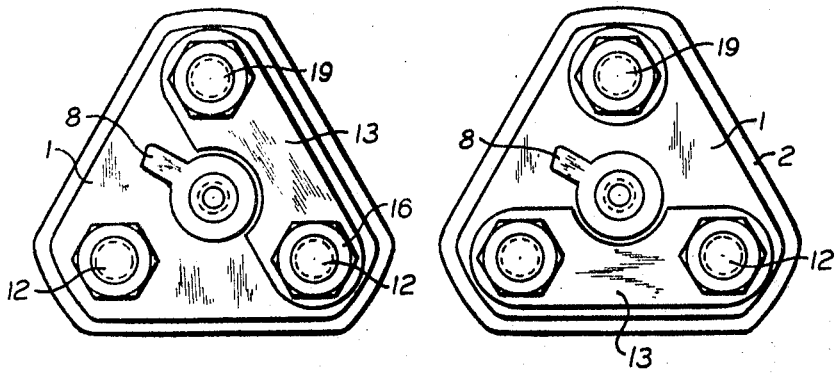
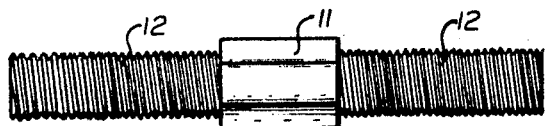
INVENTOR
TELESFORO GOROSTIZA ZABALBEITIA
BY
ATTORNEY.

United States Patent Office 3,466,592
Patented Sept. 9, 1969

3,466,592
BIVOLTAGE CONNECTION APPARATUS FOR ELECTRIC BRAKES
Telesforo G. Zabalbeitia, Dr. Areilza 44, Bilbao, Spain
Filed May 10, 1967, Ser. No. 637,528
Claims priority, application Spain, Sept. 28, 1966, 331,693
Int. Cl. H01r 29/00; B60t 13/74
U.S. Cl. 339—18                                    5 Claims

ABSTRACT OF THE DISCLOSURE

A bivoltage connection device for electric brakes having partition separating brake zones in pairs and in zone a dielectric box is linked by two rods passing through the partition. Each dielectric box includes a base part and a covering housing removably fixed thereupon. A third threaded rod which does not pass through the partition is affixed to each base part. Two of the rods in each brake zone are wired to coils of the brake. A plate-bridge is provided in each box for selective connection to a selected two of the rods, depending on the applied voltage source, other than directly to the two rods which are wired to the coils.

---

The present invention relates to electric brakes, in general, and to a system for connection of electric brakes by a safety device which provides, without the possibility of mistake, a correct adaptation of the electric bridge to the electric voltage source which operates the system, in particular.

The type of batteries which supply electric power to motor vehicles varies, depending upon the different types produced by the manufacturers. The batteries are not adapted to provide a fixed electric voltage in all types. Specifically, the voltages are normally either 12 or 24 volts. Accordingly, the mass production of mechanisms for use in an electric brake system in vehicles must incorporate means for their adaptation to either the 12 or 24 volt battery by providing for the proper change of electrical connections.

Nevertheless, with the prior mechanisms, experience has shown that this operation must not be left to the judgment of inexperienced people since any error in changing the connections can cause deterioration and damage to the brake mechanism, as well as the resulting inconveniences and discredit which this would entail.

It is one object of the present invention to provide a bivoltage connection system for electric brakes which eliminates these problems, and which provides a sure and effective device which makes any error impossible, assuring the correct voltage to the electrical circuits which are included in the brake mechanism.

It is another object of the present invention to provide a bivoltage connection system for electric brakes which comprises a base part made of an insulating material, arranged in pairs on a partition separating the two areas of the polarity ground terminals of the electric brakes. The base parts are provided with a peripheral step on which a covering housing is tightly connected, which housing is also made of insulating material, and which has a side opening through which the conductor wires of the brake coils pass into the interior of the enclosure.

The dielectric base parts each have a triangular configuration with three bevelled vertices. Two of the vertices are formed with bores which pass completely therethrough, constituting elongated perforations. The bores of one base part are aligned with the corresponding bores in the other base part and communicating through hollow shafts extending from the facing sides of the base parts and defining a prismatic shaped conduit. The free or open side of each dielectric base part has in the area corresponding to the third vertex or thermovertex of the triangle which adjusts a threaded fillet which projects from the open side and is adapted as a perforation with threaded walls with a slotted socket, for receiving therein the head of a rod.

At the center, the base part has a shaft provided with an interior theaded socket in which a screw is removably inserted for fastening thereto the covering housing of the system. In addition, the shaft has a lateral flange suitably arranged as a graduated stopper which prevents the positioning of a plate-bridge between two of the three existing connections.

Two threaded rods are provided passing through the two pairs of aligned bores, respectively, in the base parts, each having at its midsection a prismatic ring. Half of the ring is screwed on each of the two shafts which define the facing prismatic conduits forming the coupling of the dielectric base parts through the separating wall therebetween. The rods are electrically conducting and constitute an electrical bridge connection between the corresponding base parts.

The plate-bridge is electrically conductive and capable of electrically connecting two of the adjacent rods together. Of the three groups of two adjacent rods arranged at the vertices of the interior of the triangular shaped dielectric box, only two of the three possible groups are possible due to the positioning of the lateral flange, which renders impossible the bridging between one of the three groups and which makes impossible an erroneous electrical connection when changing the electrical connections for a particular voltage source.

With these and other objects in view which will become apparent in the following detailed description, the present invention will be clearly understood in connection with the accompanying drawings, in which:

FIGURE 1 is a sectional view of the apparatus of the present invention showing two dielectric boxes which are arranged opposite each other on a partition separated from the terminal parts of the mechanism;

FIG. 2 is a top plan view of one of the dielectric boxes;

FIG. 3 is a front elevation of FIG. 2 with the housing removed for purposes of better illustration;

FIGS. 4 and 5 are plan views of the base part of a box, with the plate-bridge adapted in a different manner in accordance with the working voltage required by the electrical portion of the mechanism;

FIG. 6 is a top plan view of the plate-bridge of each box;

FIG. 7 is a side view of one of two rods which electrically connects each pair of dielectric boxes;

FIG. 8 is a schematic diagram of the two brake discs each with eight contacts, showing the electrical circuit for one of the two voltage source positions due to one of the positions of the plate-bridge in the dielectric boxes;

FIG. 9 is a schematic diagram similar to FIG. 8, showing the electrical circuit established as a result of a change in the positions of the plate-bridge for another increased voltage source.

Referring now to the drawings, and more particularly to FIGS. 1–7, a pair of base parts or plates 1 is provided on both sides of a separating partition 18 for the two zones of the electric brake. The base parts 1 are made of insulating material and all connections are formed thereon. A covering housing 3 is peripherally affixed to a rim 2 of the base parts 1. The covering housing 3 has openings for electrical conductors of the brake which pass therethrough. The cover housings 3 are affixed to the base parts 1 by means of screws 5 which extend through shafts 6 and are screwed in the interior of the sockets 7 of the base parts 1. The shafts 6 are disposed centrally on the base parts 1.

Two of the vertices of the base parts 1 are formed with orifices or bores 9 which pass completely therethrough. The facing sides of the base parts 1, i.e., the sides adjacent the separating partition 18, are formed with shafts 10 of the insulating box which extend into openings 17 in the partition 18. The hollow interiors of the shafts 10 are formed as prismatic shaped conduits. The corresponding bores 9 and shafts 10 of the two base parts 1 are aligned. One of two electrically conducting connection rods 12 (FIG. 7) extends through each pair of aligned bores 9 and shafts 10, establishing two fixed electrical connections between the two dielectric boxes (as schematically indicated by the two parallel lines 12′ between the base parts 1 in FIGS. 8 and 9). In FIGS. 8 and 9, for purposes of clarity, the two base parts 1 are shown disposed on separating partition 22 (equivalent to separating partition 18 of FIG. 1) for the coils 21 and 23 on each zone of the brake, with the two zones being turned into the plane of the drawing to show both zones simultaneously. The covering housing 3 has also been removed in FIGS. 8 and 9 for better illustration. The centers of the rods 12 have a prismatic portion 11 which is secured half in each adjacent shaft 10 of the base parts 1 (FIG. 1) and two filleted extremes.

A stud or rod 19 is disposed in a recess 9′ which does not pass completely through the base parts 1 and is formed at the third vertex of each of the triangular base parts. The rods 19 of both boxes accordingly are not in electrical contact. A nut 20 is provided on the studs 19.

The two rods 12 and the rod 19 are connected with the electrical connection wires of the brake coils 21 and 23 and the power source, as indicated by the arrowed lines in FIGS. 8 and 9. The wire connections pass through the openings 4 in the covering housing 3 (not shown).

As indicated in FIGS. 8 and 9, although not limited thereto, the wires from the power source 24 or 25 are connected to the rods 19 and the terminal wires from the brake coils 21 and 23 of each zone, respectively, are connected to rods 12 and 19 of each box, one set of coils 21A and 23A being shown connected, for example.

A stop flange or arm 8 extends from the exterior of the central shaft 6 (FIGS. 1, 2, 3–5, 7 and 8) pointing between the rods 12 and 19, across which rods the terminal wires from the brake coils are connected.

An electrically conducting plate-bridge 13 (FIGS. 1, 4–6, 7 and 8) is provided with end openings 15 for connection by means of the nuts 16 selectively on two adjacent rods 19, 12 or 12, 12 for changing the parallel electrical connection of the battery source 24 with the coils 21A and 23A (in the left- and right-hand zones, respectively, of FIG. 8) into the series connection of the battery 25 with the coils 21A and 23A of FIG. 9.

The flange 8 prevents the direct connection of those rods 12, 19 across which are connected the terminal wires of the brake coils on each zone of the brake, by preventing the plate-bridge 13 from being attached to these rods, thereby preventing an improper positioning of the plate-bridge 13.

To change the electrical connections from the parallel brake coil arrangement of FIG. 8 for the 12 volt power source 24 to the series arrangement of FIG. 9 for the 24 volt power source 25, it is merely necessary to change connection of the bridge-plates 13 on the rods, as indicated. No changes of the wire connections are required, as may be noted from a comparison of FIGS. 8 and 9 where the wires from the coils and the power source remain connected to the same rods in both cases. Each brake coil operates with the same voltage thereacross in the connection changes of both FIGS. 8 and 9, even though the voltage sources are different.

The plate-bridge 13 has a semicircular lateral recess 15 to permit the central shaft 6 of the base part 1 to fit without obstruction in its two possible positions (FIGS. 4 and 5), respectively. However, the flange 8 prevents the improper connection.

It should be noted that in FIGS. 8 and 9 only one of the wire connections is illustrated, through which connection current is established for four of the coils 21A and 23A of the electric brake to be connected with the supposition that at each point of braking only four of the sixteen contacts are involved, as a result of which four positions are obtained until complete braking when all the magnetic poles are involved.

I claim:

1. A bivoltage connection apparatus for electric brakes, having two zones, comprising
   a partition separating the two zones of the electric brake,
   two base plates made of electrically insulating material, each disposed on opposite sides of said partition,
   two electrically conductive through-rods each passing through said base plates and said partition,
   two third rods each secured to each base plate,
   electrical brake wires and power source wires connected respectively to said rods,
   a covering housing releasably mounted on each of said base plates covering the ends of said rods, and
   an electrically conducting plate bridge having openings for selective connection between two of said rods.

2. The apparatus, as set forth in claim 1, further comprising
   a flange member disposed on each of said base plates centrally between said rods and including a lateral flange projecting between two of said rods for preventing connection of said plate bridge between said two of said rods,
   said flange member forming a socket, and
   bolt means for passing through said covering housing and into said socket for releasably mounting said covering housing on said base plate.

3. The apparatus, as set forth in claim 1 wherein
   said two base plates include aligned opposed shafts of each base plate and aligned bores in said base plates through which said through-rods are disposed,
   said shafts form a primatic hollow interior,
   a prismatic portion complementary in cross-section to said hollow interior and disposed centrally on said through-rods and positioned half in each of said aligned opposed shafts, and
   said separating partition having openings therethrough through which said aligned opposed shafts pass.

4. The apparatus, as set forth in claim 1, wherein said rods are equidistantly disposed on said base plate,
a flange member disposed on each of said base plates centrally between said rods and including a lateral flange projecting between two of said rods for preventing connection of said plate bridge between said two of said rods, and
said bridge plate having a lateral recess complementary in part to said flange member permitting connection of said plate bridge between the other two different combinations of adjacent rods.

5. The apparatus, as set forth in claim 1, wherein said base plates are substantially triangular in configuration,
said rods are threaded, and
bolts disposed on said rods for connecting said wires thereto.

References Cited

UNITED STATES PATENTS 2,727,215 12/1955 Brown.
2,924,805 2/1960 Lenehan.
3,343,121 9/1967 Lewis.

FOREIGN PATENTS 538,291 6/1955 Belgium.

DUANE A. REGER, Primary Examiner

U.S. Cl. X.R.

188—158